(12) United States Patent
Takaha et al.

(10) Patent No.: US 8,013,148 B2
(45) Date of Patent: Sep. 6, 2011

(54) MOLDED OBJECT COMPRISING α-1,4-GLUCANS AND/OR MODIFICATIONS THEREOF AND PROCESS FOR PRODUCING THE SAME

(75) Inventors: Takeshi Takaha, Hyogo (JP); Kazutoshi Fujii, Osaka (JP); Takashi Kuriki, Osaka (JP); Kenichi Kudo, Nara (JP); Mamoru Wada, Nara (JP); Michihiro Sunako, Nara (JP); Junichi Takahara, Nara (JP)

(73) Assignees: Ezaki Glico Co., Ltd., Osaka (JP); Sanwa Cornstarch Co., Ltd., Nara (JP)

( * ) Notice: Subject to any disclaimer, the term of this patent is extended or adjusted under 35 U.S.C. 154(b) by 1172 days.

(21) Appl. No.: 10/563,595

(22) PCT Filed: Jul. 9, 2004

(86) PCT No.: PCT/JP2004/010149
§ 371 (c)(1),
(2), (4) Date: Feb. 3, 2006

(87) PCT Pub. No.: WO2005/010093
PCT Pub. Date: Feb. 3, 2005

(65) Prior Publication Data
US 2006/0134417 A1      Jun. 22, 2006

(30) Foreign Application Priority Data
Jul. 9, 2003   (JP) .................. 2003-272593

(51) Int. Cl.
*C07H 1/00* (2006.01)
*C08B 30/20* (2006.01)
(52) U.S. Cl. .................. 536/124; 536/123.12
(58) Field of Classification Search ........... None
See application file for complete search history.

(56) References Cited

U.S. PATENT DOCUMENTS

| 6,323,265 | B1 | 11/2001 | Bengs et al. |
| 6,908,885 | B2 * | 6/2005 | Bengs et al. .......... 504/366 |
| 2003/0185863 | A1 | 10/2003 | Bengs et al. |

FOREIGN PATENT DOCUMENTS

| JP | 2001-509528 | 7/2001 |
| WO | 01/85836 | 11/2001 |
| WO | WO 02/102355 | * 12/2002 |

OTHER PUBLICATIONS

IUPAC. Compendium of Chemical Terminology, 2nd ed (the "Gold Book". Compiled by A.D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8; last viewed Sep. 2009.*

* cited by examiner

*Primary Examiner* — Shaojia Anna Jiang
*Assistant Examiner* — Bahar Schmidtmann
(74) *Attorney, Agent, or Firm* — Wenderoth, Lind & Ponack, L.L.P.

(57) ABSTRACT

The present application discloses a molded article, and a process for preparing a molded article consisting essentially of (i) high molecular weight linear α-1,4-glucan and (ii) low molecular weight linear α-1,4-glucan, wherein the process comprises the step of: adding the low molecular weight linear α-1,4-glucan to a solution comprising the high molecular weight linear α-1,4-glucan to gel the solution, wherein the low molecular weight linear α-1,4-glucan has a degree of polymerization of greater than or equal to 180 and less than 620, and has a molecular weight distribution of not greater than 1.25 and, the high molecular weight linear α-1,4-glucan has a degree of polymerization of greater than or equal to 620 and less than 37000, and has a molecular weight distribution of not greater than 1.25.

16 Claims, 1 Drawing Sheet

Fig. 1

MOLDED OBJECT COMPRISING α-1,4-GLUCANS AND/OR MODIFICATIONS THEREOF AND PROCESS FOR PRODUCING THE SAME

This application has a priority right of Japanese patent application No. 2003-272593, filed Jul. 9, 2003, which is herein incorporated by references.

FIELD OF THE INVENTION

The present invention relates to a molded article with excellent biodegradability and moldability which contains α-1,4-glucans and/or its modification. The present invention also relates to a method for producing the molded article.

BACKGROUND OF THE INVENTION

Synthetic polymer that is made from petroleum as raw material and has been produced with very large amount on the earth causes social problem for disposal of waste polymer, because it emits poisonous gas when it burns and does not degrade in natural surroundings. Additionally, it is pointed out that petroleum-made plastics, such as polystyrene or polycarbonate, contain an endocrine disrupter which may injure living of the human beings. Other plastics often contain some oligomer, but it has been warned that the oligomer may harm the human bodies.

It is also noted to replace petroleum plastics with agricultural product, especially starch material, in view of energy and resource strategy after exhaustion of petroleum resource and zero-emission system of carbon dioxide.

Thus, instead of the synthetic polymeric material obtained from petroleum resources, polymeric materials that are obtained from starch or wood has been developed, because they are harmless to human bodies and do not destroy nature. These products have been used for years and are safe to human bodies. They are also buried in soil and degraded with bacteria or microorganism.

Some products formed from starch have already been available, such as a cushioning which is produced by the steps of extrusion-forming starch in the presence of water, and such as trays or cups which are produced by heat-forming and molding of starch slurry. The starch products are, however, poor in water resistance and strength characteristics, in comparison with those obtained from synthetic polymers. It is also proposed that starch is mixed with other biodegradable synthetic polymers to form into film, sheet or molded article, but the final products do not have sufficient properties as required for industrial products. It is still desired to develop starch products having sufficient physical and chemical properties equal to those obtained from petroleum based synthetic polymers.

There are some problems inherent to starch products as follow:

(a) Natural starch is generally composed of a mixture of amylose (polymer having a construction of linearly bonded glucoses) and amylopectin (bunch-shape polymer composed of amylose having branches). The linear amylose has good processability, film properties and molding abilities equal to synthetic plastics, but the amylopectin shows poor strength characteristics. Thus, natural starch which is a mixture of amylose and amylopectin has poor strength properties.

(b) Amylose content of natural starch is not so high. For example, corn starch has amylose content of as low as about 25% and even high-amylose corn starch has an amylose content of about 70% or less. Thus, such natural starch provides a poor molded article.

(c) Amylose can be extracted or separated from natural starch, but its process is complicated and yield of amylose is very low. The process does not have industrial cost effectiveness.

(d) Amylose present in natural starch generally has a molecular weight of as low as about ten thousand Da to hundred thousand Da. For example, amylose in corn starch has a molecular weight of 250000 Da (250 kDa), and amylose of starch in Irish potato has a molecular weight of 490000 Da (490 kDa). It is known to the art that amylose with low-molecular weight is easily retrograded and shows poor mechanical strength. Accordingly, ever if amylose is effectively extracted or separated from natural starch, the resultant amylose dose not has sufficient characteristics for substituting plastics.

(e) Amylose present in natural starch has a broad molecular weight distribution (Mw/Mn) of greater than or equal to 1.3. A molded article which made by amylose having a broad molecular weight distribution has poor strength properties and processability.

(f) Amylose present in natural starch does not have complete linear structure, but has small amount of branched structure. Thus, the nucleation speed of natural amylose is fast and the natural amylose easily crystallizes by itself. The characteristics of natural amylose make the structure of film or sheet nonuniform and significantly reduce transparency and mechanical strength.

(g) Amylose present in natural starch easily dissolves in hot water of greater than or equal to 130° C., but precipitates at a temperature of less than 130° C. (re-crystallization) to form cloudy solution because of the reasons mentioned in the above (d), (e) and (f). The molded article obtained therefrom also has a nonuniform structure and shows poor processability, poor transparency and poor strength.

(h) Amylose present in natural starch does not easily dissolve in water at ambient temperature, but dissolves in specific organic solvent, such as dimethylsulfoxide and dimethylformamide. The use of natural amylose requires the process to recover the organic solvent, so that the process is not good for manufacturing because of cost effectiveness. Absence of good and useful solvent is also a serious disadvantage of natural amylose upon altering its polymeric properties by chemical modification.

(i) In order to modify the polymeric characteristics of natural starch, it is also proposed to graft-polymerize starch molecules with vinyl monomer, such as methyl acrylate, methyl methacrylate, or styrene. The modification raises cost of production, but does not enhance polymeric characteristics so much. Additionally the vinyl graft portions do not show biodegradation.

(j) It is difficult for natural amylose to control swelling by chemical crosslinking reaction.

Industrial application of natural amylose does not proceed so much because of the above mentioned reasons.

In recent years, an approach for using synthesized amylose in place of natural amylose has been studied. One approach for producing synthesized amylose is bonding glucose by an enzyme to synthesized amylose (called enzyme synthesizing method).

In an example of the approach, it is proposed that sucrose is used as substrate and is treated with amylosucrase (EC 2.4.1.4), which is called AMSU method. In AMSU method, however, the resulting α-1,4-glucan has low-degree of polymerization. It has been reported that even if highly purified amylosucrase is employed, the resulting amylose has a molecular weight of 8,941 Da (see FEBS Ltters 471, Montalk et al, pp 219 to 223 (2000)).

In AMSU method, the resulting α-1,4-glucan has low average molecular weight such as several thousand Da, even if the α-1,4-glucan has narrow molecular weight distribution. α-1,4-glucan having a molecular weight of less than several tens of thousand easily precipitates, and it is hard to form a molded article to employ the α-1,4-glucan. On the condition that a molded article can be formed by employing the α-1,4-glucan, there is a problem that the resulting molded article does not have sufficient strength properties.

As an enzyme-synthesizing method other than the AMSU method, a method using glucan phosphorylase (α-glucan phosphorylase, EC 2.4.1.1.: generally called phosphorylase) is proposed. The enzyme-synthesizing method includes a method reacting phosphorylase with a substrate (glucose-1-phosphate: G-P-1) and transferring glucosyl unit from glucose-1-phosphate to a primer (malto-heptaose), which is called as GP method. The enzyme-synthesizing method also includes a method reacting sucrose phosphorylase in addition to phosphorylase with sucrose to synthesis G-P-1, and transferring glucose of G-P-1 to a primer, which is called as SP-GP method. (see, for example, WO 02/097107 pamphlet.)

WO 02/06507 pamphlet discloses an article formed from enzyme-synthesized amylose with a weight average molecular weight of greater than or equal to 100 kDa and a molecular weight distribution (Mw/Mn) of not more than 1.25. The enzyme-synthesized amylose includes no amylopectin which deteriorates strength properties of the resulting molded article. In addition, the enzyme-synthesized amylose is composed of completely-linear amylose, which can not be accomplished in natural amylose. Furthermore, the enzyme-synthesized amylose can be designed for having a molecular weight distribution of not greater than 1.25, which is narrow molecular weight distribution and can not be accomplished in natural amylose. Thus, the method provides a molded article having excellent transparency, processability and strength properties. In the method, however, has a problem of difficulty of molding resulting from relatively-high water solubility and long gelation time of the enzyme-synthesized amylose having an average molecular weight of greater than or equal to 100 kDa.

WO 99/02600 pamphlet discloses a thermoplastic mixture. Claims of WO 99/02600 disclose that the thermoplastic mixture is obtainable by preparing and mixing;
(A) 100 parts by weight of a biocatalytically produced 1,4-α-polyglucan,
(B) up to 400 parts by weight of a melt-processable polymeric material different from (A),
(C) water in an amount sufficient for plastification of the mixture,
(D) at least one plasticizer in an amount of 10 parts by weight up to half the total of the parts by weight of (A) and (B), and
(E) optionally up to ((A)+(B)) parts by weight of other conventional additives, provided that the water content of components (A) and (B) has been corrected to zero by calculation.

The reason why component (A): 1,4-α-polyglucan is used for the preparation of the thermoplastic mixture in WO 99/02600 is not clear. In WO 99/02600, component (B) includes various materials such as proteins, starches, various polysaccharides and synthesis resins. Therefore, the invention described in WO 99/02600 is disparate from the present invention, that is two kinds of α-1,4-glucans (high molecular weight α-1,4-glucan and α-1,4-glucan having low-molecular weight) are mixed and thus provides a molded particle. Furthermore, to make a molded article using the thermoplastic mixture in WO 99/02600 requires a heat process. For example, making a molded article in an example described in WO 99/02600 includes heating process within the range of 100-160° C.

SUMMARY OF THE INVENTION

Problems to be Resolved by the Invention

The present invention solves the above-mentioned problems, and the object thereof is to provide a molded article with excellent biodegradability and moldability which contains α-1,4-glucans and/or its modification, and to provide a method for producing the molded article.

Solution of the Problems

The inventors of the present invention have rigorously researched for making a molded article of α-1,4-glucans, and eventually found that by adding α-1,4-glucan having low-molecular weight to a solution of high molecular weight α-1,4-glucan, easy gelation of α-1,4-glucan solution having high-molecular weight can be achieved. Based on this finding, the inventors completed the present invention.

The present invention provides a molded article comprising
high molecular weight α-1,4-glucan and/or its modification, and
α-1,4-glucan having low-molecular weight and/or its modification,
wherein
the α-1,4-glucan having low-molecular weight has a degree of polymerization of greater than or equal to 180 and less than 620, and the high molecular weight α-1,4-glucan has a degree of polymerization of greater than or equal to 620 and less than 37000, which accomplishes the above objective.

The α-1,4-glucan having low-molecular weight may preferably have the degree of polymerization of greater than or equal to 180 and less than 560, and the high molecular weight α-1,4-glucan may preferably have the degree of polymerization of greater than or equal to 680 and less than 37000.

The α-1,4-glucan having low-molecular weight may preferably have a molecular weight distribution of not greater than 1.25, and the high molecular weight α-1,4-glucan may preferably have a molecular weight distribution of not greater than 1.25.

In an example of the molded article, the α-1,4-glucans may be enzyme-synthesized α-1,4-glucan.

The modification of the α-1,4-glucans may preferably be a chemical modification selected from the group consisting of esterification, etherification and crosslinking.

In an example of the molded article, a weight ratio of high molecular weight α-1,4-glucan and/or its modification:α-1,4-glucan having low-molecular weight and/or its modification may be within the range of 99:1 to 25:75.

In an example of the molded article, a weight ratio of high molecular weight α-1,4-glucan and/or its modification:α-1,4-glucan having low-molecular weight and/or its modification may be within the range of 99:1 to 50:50.

In an example of the molded article, a weight ratio of high molecular weight α-1,4-glucan and/or its modification:α-1,4-glucan having low-molecular weight and/or its modification may be within the range of 99:1 to 75:25.

An example of the molded article may be film, sheet, coating, fiber, yarn, non-woven fabric, a food container, an edible container, a medical material, a medical device or a gelatinous molded article.

An another example of the molded article may be a contact-type food container which directly covers a surface of an agricultural product or a food product.

An example of the molded article may be a hard capsule, soft capsule or a seamless capsule.

An example of the molded article may be a feed for an animal, a food or a food additive.

The present invention also provides a process for preparing a molded article comprising high molecular weight α-1,4-glucan and/or its modification and α-1,4-glucan having low-molecular weight and/or its modification. An example of the process may comprise the step of:

adding the α-1,4-glucan having low-molecular weight and/or its modification to a solution comprising the high molecular weight α-1,4-glucan and/or its modification to gel the solution.

An example of the process may comprise the step of:

cooling a solution comprising the high molecular weight α-1,4-glucan and/or its modification and the α-1,4-glucan having low-molecular weight and/or its modification to gel the solution.

An example of the process may comprise the step of:

neutralizing an alkaline solution comprising the high molecular weight α-1,4-glucan and/or its modification and the α-1,4-glucan having low-molecular weight and/or its modification to gel the solution.

In the process, the α-1,4-glucan having low-molecular weight may preferably have a degree of polymerization of greater than or equal to 180 and less than 620, and has a molecular weight distribution of not greater than 1.25 and, the high molecular weight α-1,4-glucan may preferably have a degree of polymerization of greater than or equal to 620 and less than 37000, and has a molecular weight distribution of not greater than 1.25.

In the process, the α-1,4-glucan having low-molecular weight may preferably have a degree of polymerization of greater than or equal to 180 and less than 560, and may preferably have a molecular weight distribution of not greater than 1.25 and, the high molecular weight α-1,4-glucan may preferably have a degree of polymerization of greater than or equal to 680 and less than 37000, and may preferably have a molecular weight distribution of not greater than 1.25.

In an example of the process, the α-1,4-glucans may be enzyme-synthesized α-1,4-glucan.

In an example of the process, the modification of the α-1,4-glucans may be a chemical modification selected from the group consisting of esterification, etherification and crosslinking.

In an example of the process, a weight ratio of high molecular weight α-1,4-glucan and/or its modification:α-1,4-glucan having low-molecular weight and/or its modification may be within the range of 99:1 to 25:75.

In an example of the process, a weight ratio of high molecular weight α-1,4-glucan and/or its Modification:α-1,4-glucan having low-molecular weight and/or its modification may be within the range of 99:1 to 50:50.

In an example of the process, a weight ratio of high molecular weight α-1,4-glucan and/or its modification:α-1,4-glucan having low-molecular weight and/or its modification may be within the range of 99:1 to 75:25.

The present invention also provides an use of α-1,4-glucan having low-molecular weight and a degree of polymerization of greater than or equal to 180 and less than 620, in the step of gelling a solution containing α-1,4-glucan.

Effect of the Invention

In order to produce a molded article formed from a high molecular weight α-1,4-glucan, the present invention makes it possible to easily gel a high molecular weight α-1,4-glucan solution by adding low molecular weight α-1,4-glucan which is not suitable in nature for making a molded article. The present invention also provides the molded article with excellent biodegradability, and favorable moldability and properties.

DETAILED DESCRIPTION OF THE PREFERRED EMBODIMENTS

Polymer compounds other than protein have a few range of molecular weights, whether they originate naturally or synthetically. A molecular weight distribution (Mw/Mn) of polymer compounds is typically used for showing a degree of distribution of molecular weight in the field of polymer chemistry. The molecular weight distribution (Mw/Mn) is a rate of a weight-average molecular weight (Mw) based on number average molecular weight (Mn). The molecular weight distribution means an indicator of a breadth of a molecular weight distribution of a polymer compound. When a polymer compound has a completely single peak of a molecular weight, a molecular weight distribution (Mw/Mn) of the polymer compound is 1. When a polymer compound has a broader range of molecular weights, a molecular weight distribution (Mw/Mn) of the polymer compound is more than 1. The term "molecular weight distribution (Mw/Mn)" may also be referred as "degree of dispersion", and in the present specification, the terms "molecular weight distribution (Mw/Mn)" and "degree of dispersion" have same meaning herein. The term "molecular weight" means "weight-average molecular weight" unless otherwise specified.

The term "molded article" herein means an object having some shape. The molded article in the specification includes, for example, film, sheet, covering, fiber, yarn, nonwoven fabric, case and packaging material, as well as capsule, food, feed, food additive, medical material, medical supply, gel sheet, gel pellet, gelatinous material. The molded article also includes an object which is deformable depending on outside pressure, for example gelatinous material and flexible material, as long as it has shape. In contrast, the molded article in the present invention does not include a tablet for medical use.

The term "1,4-glucan" refers to a polysaccharide having D-glucose as constituting unit, which contains at least two saccharide units linked by an α-1,4-glucoside bond. 1,4-glucan has straight-chain. 1,4-glucan refers to straight-chain glucan. A degree of polymerization refers to a number of saccharide units in one molecular of 1,4-glucan. The term "degree of polymerization" means "weight-average degree of polymerization" unless otherwise specified. A weight-average degree of polymerization of 1,4-glucan is calculated from dividing a weight-average molecular weight by a molar weight of glucose unit, that is 162.

α-1,4-Glucans and its Modification

The molded article of the present invention is a molded article containing:

high molecular weight α-1,4-glucan and/or its modification, and low molecular weight α-1,4-glucan and/or its modification.

The high molecular weight α-1,4-glucan in the present invention has a degree of polymerization of greater than or equal to 620 and less than 37000. Degree of polymerization of the high molecular weight α-1,4-glucan may preferably be greater than or equal to 680 and less than 37000. The molded article having excellent propserties may be obtained by using such high molecular weight α-1,4-glucan.

A molecular weight distribution of the high molecular weight α-1,4-glucan may preferably be not greater than 1.25. The α-1,4-glucans has different properties depending on its molecular weight. Moldability control under mixing and control of properties of the molded article can be achieved by using the high molecular weight α-1,4-glucan and having narrow molecular weight distribution.

Such high molecular weight α-1,4-glucan can be synthesized by a method known in the art. The high molecular weight α-1,4-glucan may preferably be synthesized by an enzyme-synthesizing method. An example of the enzyme-synthesizing method includes a method using glucan phosphorylase (α-glucan phosphorylase, EC 2.4.1.1.: generally called phosphorylase). Phosphorylase is an enzyme which catalyzes a phosphorolysis.

An example of the enzyme-synthesizing method using glucan phosphorylase is a method wherein phosphorylase is functioned with a substrate (glucose-1-phosphate: G-P-1) to transfer glucosyl unit from glucose-1-phosphate to a primer (e.g., malto-heptaose), which is called as GP method. In the GP method, G-1-P used as a raw material is expensive, and the GP method requires high-cost to produce α-1,4-glucan industrially. On the other hand, the GP method has a significant advantage that the GP method provides 1,4-glucan having only straight-chain by sequential bonding using only α-1,4-glycoside bond. The GP method is known in the art.

Another example of the enzyme-synthesizing method using phosphorylase is a method using sucrose as a substrate and for example malto-oligosaccharide as a primer, wherein these substrate and primer are functioned with sucrose phosphorylase (EC 2.4.1.7) and glucan phosphorylase in the presence of inorganic phosphate, to produce α-1,4-glucan by enzyme-reaction, which is called as SP-GP method. The SP-GP method has an advantage that the SP-GP method provides 1,4-glucan having only straight-chain with freely controlled molecular weight, which is similar to the GP method. In addition, the SP-GP method has an advantage of low-cost by using less-expensive sucrose as a raw material. The SP-GP method is known in the art. Preferable SP-GP method is described in, for example, WO 02/097107 pamphlet. The high molecular weight α-1,4-glucan of the present invention can be synthesized by the method described in WO 02/097107 pamphlet.

A primer for use in the present invention refers to a molecule which functions as a starting material for glucan synthesis. The primer includes oligosaccharide. Preferable primer may include maltooligosaccharide such as maltotriose, maltotetraose, maltopentaose or maltohexaose, and amylose (e.g., α-1,4-glucan). One primer or a mixture of two or more primers may be used.

In contrast, the AMSU method described above is also a method for producing α-1,4-glucan by use of an enzyme. The resulting α-1,4-glucan however has extremely low-degree of polymerization (less than 9 kDa), therefore, the method is not suitable for producing high molecular weight α-1,4-glucan according to the present invention.

The high molecular weight α-1,4-glucan obtained by the GP method or the SP-GP method has the following characteristics;
(1) narrow molecular weight distribution, for example, Mw/Mn of not greater than 1.1,
(2) α-1,4-glucan having any degree of polymerization (from about 60 to about 370) by control of producing conditions,
(3) complete linear structure and no branched structure, such branched structure is present in amylose which is isolated from natural starch,
(4) solely composed of glucose residue, and all of α-1,4-glucan, intermediate in the degradation of α-1,4-glucan and final degradation products of α-1,4-glucan are harmless to living organisms, and
(5) optional chemical-modifying starch is possible same as natural starch.

The high molecular weight α-1,4-glucan obtained by the GP method or the SP-GP method may preferably be used in the present invention.

Low molecular weight α-1,4-glucan in the present invention has a degree of polymerization of greater than or equal to 180 and less than 620. Degree of polymerization of the low molecular weight α-1,4-glucan may preferably be greater than or equal to 180 and less than 560. The molded article having excellent properties may be obtained by using such low molecular weight α-1,4-glucan.

A molecular weight distribution of the low molecular weight α-1,4-glucan may preferably be not greater than 1.25. α-1,4-glucan has different properties depending on its molecular weight. Moldability control under mixing and control of properties of the molded article can be achieved by using the low molecular weight α-1,4-glucan and having narrow molecular weight distribution.

Such low molecular weight α-1,4-glucan can be synthesized by the methods for producing the high molecular weight α-1,4-glucan as described above. The low molecular weight α-1,4-glucan can be synthesized by the methods described above with a change of amount of raw materials and the like.

When α-1,4-glucan is synthesized by for example the GP method and/or the SP-GP method using an enzyme, α-1,4-glucan having different molecular weight or crystal form can be obtained depend on producing conditions such as amount of raw materials. In particular, when the low molecular weight α-1,4-glucan is synthesized by the GP method and/or the SP-GP method, the α-1,4-glucan having lower-molecular weight can be obtained by use of larger amount of primer. Changing an amount of primer can readily provide α-1,4-glucans having different molecular weight or crystal form.

In case of synthesizing the low molecular weight α-1,4-glucan by the GP method and/or the SP-GP method, obtained the low molecular weight α-1,4-glucan can be precipitated in a reaction mixture. On the other hand, obtained the high molecular weight α-1,4-glucan is still soluble in a reaction mixture. The resulting α-1,4-glucan can readily be purified by the GP method and/or the SP-GP method in addition to easy preparation of α-1,4-glucan having different degree of polymerization. A boundary between precipitation and solubilization of obtained α-1,4-glucan is typically degree of polymerization of about 620 (molecular weight of about 100 kDa), but the boundary may vary depending on producing conditions. In case of separating amylose from natural starch, separation of amylose based on degree of polymerization is difficult.

The α-1,4-glucans having high-molecular weight and having low-molecular weight may be modified, or may not be modified. Modification means a compound produced from chemical-modifying on an object. An example of chemical-modifying includes esterification, etherification or crosslinking.

The esterification can be conducted by reacting the α-1,4-glucan with esterifying agent such as acid anhydride, organic acid, acid halide, ketene or other esterifying agent in the presence or absence of solvent. The esterification can provide acylation ester such as acetic ester or propionate ester.

The etherification can be conducted by reacting α-1,4-glucan with etherifying agent such as alkyl halide or dialkyl sulfate in the presence of alkali. The etherification can provide carboxymethyl ether, hydroxypropyl ether, hydroxymethyl ether, methyl ether and ethyl ether.

The crosslinking can be conducted by reacting the α-1,4-glucan with crosslinking agent such as formaldehyde, epichlorohydrin, glutaraldehyde, diglycidyl ethers and esters.

When the α-1,4-glucan in the molded article of the present invention is modified, the modification may preferably be chemical modification selected from the group consisting of the esterification, the etherification and the crosslinking. More preferable modification may be the etherification, and most preferable modification may be carboxymethyl etherification. The chemical modification such as carboxymethyl etherification can improve water solubility of α-1,4-glucan. On the other hand, the chemical modification of the α-1,4-glucan with hydrophobic group such as acetyl group can improve water resistance of α-1,4-glucan. Using one or more chemical modification of α-1,4-glucan can vary water solubility, hydrophobic property, resolvability to water or viscosity of α-1,4-glucan. Selection of chemical modification depend on a desired molded article is possible.

The molded article of the present invention contains the high molecular weight α-1,4-glucan and/or its modification, and the low molecular weight α-1,4-glucan and/or its modification. Containing the high molecular weight α-1,4-glucan and/or its modification, and the low molecular weight α-1,4-glucan and/or its modification can provide the molded article with excellent moldability and physical properties.

It has been ascertained from study conducted by the present inventors that α-1,4-glucan having a degree of distribution of about 620, that is α-1,4-glucan having middle-molecular weight can solidify by itself and can produce the molded article. The resulting molded article, however, has low intensity and has limitation of its application. In contrast, the present invention has accomplish production of the molded article which excellent moldability and physical properties based on containing the high molecular weight α-1,4-glucan and/or its modification, and the low molecular weight α-1,4-glucan and/or its modification in a molded particle.

A mold article of the present invention may contain one or more the high molecular weight α-1,4-glucan and/or its modification, and one or more the low molecular weight α-1,4-glucan and/or its modification. The present invention may contain many kinds of α-1,4-glucans having different degree of polymerization, such as more than three, four, five, six, seven, eight, nine or ten kinds. In case where the molded article contains many kinds of α-1,4-glucans, since each α-1,4-glucan may damage the properties of other α-1,4-glucan, kinds of the α-1,4-glucans contained in the molded article may preferably be not more than 5 kinds, more preferably not more than 4 kinds, most preferably 3 kind, particularly preferably 2 kinds, that is a combination of the high molecular weight α-1,4-glucan and/or its modification having a single degree of polymerization with the low molecular weight α-1,4-glucan and/or its modification having a single degree of polymerization is most preferable.

A weight ratio of high molecular weight α-1,4-glucan and/or its modification:low molecular weight α-1,4-glucan and/or its modification may preferably be within the range of 99:1 to 25:75. When the molded article contains larger amounts of the high molecular weight α-1,4-glucan, the molded article has high intensity and flexibility. When the molded article contains larger amounts of the low molecular weight α-1,4-glucan, the molded article has fast gelling ability and excellent moldability. Selection of weight ratio of the α-1,4-glucans within the above range can provide a molded particle with good physical properties and moldability. When the amounts of the high molecular weight α-1,4-glucan are greater than 99%, lateness or incapability of gelation may occur. When the amounts of the low molecular weight α-1,4-glucan are greater than 75%, intensity or flexibility of the molded article may be deteriorated and the resulting molded article may be fragile. The weight ratio of the high molecular weight α-1,4-glucan and/or its modification and the low molecular weight α-1,4-glucan and/or its modification may more preferably be within the range of 99:1 to 50:50, most preferably within the range of 99:1 to 75:25.

Additives

The molded article of the present invention may contain various additives. An example of additives includes plasticizer, flexible agent, lubricant agent, coloring agent, electrolyte, crosslinking agent and various polymers. Addition of such additives to the molded article can improve its physical properties.

An example of plasticizer of the additives includes glycerine, monoacetylene, diacetylene, triacetylene, ethylene glycol, diethylene glycol, triethylene glycol, sucrose fatty acid esters, glycerine fatty acid esters. Addition of the plasticizer can improve processability of the molded article.

An example of flexible agent of the additives includes glycerine derivatives such as glycerine, monoacetin, diacetin or triacetin; ethylene glycol derivatives such as ethylene glycol, diethylene glycol, triethylene glycol or polyethylene glycol; saccharides such as dextrin, glucose, fructose, sucrose or maltooligosaccharide; fatty acid esters such as sucrose fatty acid ester or glycerine fatty acid ester. Addition of the flexible agent can improve flexibility and stretch property of the molded article.

An example of electrolyte of the additives includes potassium ion, calcium ion, magnesium ion, ammonium ion, sodium ion, lithium ion, chloride ion, iodide ion, bromide ion, sulphate ion, nitric acid ion, phosphate ion. Addition of the electrolyte can control acceleration or deceleration of gelation depending on changing of a kind or concentration of the electrolyte.

An example of crosslinking agent of the additives includes formalin, epichlorohydrin, glutaraldehyde, a variety of diglycidyl ethers and esters. Formation of crosslinkage can improve intensity, waterproof property or prevention of moisture of the molded article.

An example of polymers of the additives includes proteins such as gelatine, gluten, egg albumen, egg yolk; polysaccharides such as pullulan, alginic acid, carrageenan, Cyamoposis Gum, agar, chitosan, cellulose and derivatives thereof; dextrin, starch and derivatives thereof; polyesters such as polylactide, poly-ε-caplolactone; and resin such as polyamides, polyolefin. Addition of the polymers can control gelation, and can vary intensity, solubility or prevention of moisture of the molded article.

Method for Producing the Molded Article

One embodiment of a method for producing the molded article of the present invention includes a step of adding the low molecular weight α-1,4-glucan and/or its modification to a solution containing the high molecular weight α-1,4-glucan and/or its modification to gel. In the method, first the high molecular weight α-1,4-glucan and/or its modification is dissolved with a solvent. The solvent used in the method and the following method typically includes an aqueous solvent. Various raw materials, additives and organic solvents may be added to the solvent.

Adding the low molecular weight α-1,4-glucan and/or its modification to the solution containing the high molecular weight α-1,4-glucan and/or its modification and optional mixing can obtain a gelation of the solution. The low molecular weight α-1,4-glucan and/or its modification may be added to the solution in the form of solution with a suitable solvent, and it is preferable. On the other hand, the low molecular weight α-1,4-glucan and/or its modification may be added to the solution in the form of powder. An example of an usable solvent which dissolves the low molecular weight α-1,4-glucan includes, for example, amphiphilic solvents such as dimethylformamide, dimethylsulfoxide or lower alcohols. An aqueous solvent may be used together with the amphiphilic solvent(s). The low molecular weight α-1,4-glucan may be dissolved in an alkaline solution or dissolved under heating, and the resulting solution may be added to the solution containing the high molecular weight α-1,4-glucan.

Another embodiment of a method for producing the molded article of the present invention includes a step of cooling a solution containing the low molecular weight α-1,4-glucan and/or its modification and the high molecular weight α-1,4-glucan and/or its modification to gel. In the method, first a solution containing both the low molecular weight α-1,4-glucan and/or its modification and the high molecular weight α-1,4-glucan and/or its modification is prepared. The solution may preferably be prepared under heating within the temperature of 70 to 150° C. to dissolve the α-1,4-glucans. Cooling the resulting solution containing the low molecular weight α-1,4-glucan and/or its modification and the high molecular weight α-1,4-glucan and/or its modification can obtain a gelation of the solution. When the solution containing the α-1,4-glucans has a temperature within the range of 70 to 150° C., cooling the solution at a temperature within the range of 0 to 70° C. can obtain a gelation of the solution. Various raw materials, additives and organic solvents may be added to the solvent.

Another embodiment of a method for producing the molded article of the present invention includes a step of neutralizing an alkaline solution containing the low molecular weight α-1,4-glucan and/or its modification and the high molecular weight α-1,4-glucan and/or its modification to gel. In the method, first an alkaline solution containing both the low molecular weight α-1,4-glucan and/or its modification and the high molecular weight α-1,4-glucan and/or its modification is prepared. The alkaline solution may be prepared by adding the α-1,4-glucan having high-molecular and the α-1,4-glucan having low-molecular to an alkaline aqueous water. Alternatively the alkaline solution may be prepared by adding a base to a solution containing the α-1,4-glucan having high-molecular and the α-1,4-glucan having low-molecular to alkalinize. An example of the base in the alkaline solution includes, but not limited to, sodium hydroxide, calcium hydroxide, ammonium hydroxide, potassium hydroxide, sodium carbonate, potassium carbonate, sodium hydrogen carbonate, calcium hydrogen carbonate, sodium acetate or the like. pH of the alkaline solution may preferably be within the range of 9 to 14, but not limited to.

Neutralizing the resulting alkaline solution containing the low molecular weight α-1,4-glucan and/or its modification and the high molecular weight α-1,4-glucan and/or its modification can obtain a gelation of the solution. A gelation speed of the alkaline solution is fast. In addition, physical properties of the resulting gel enough to handle the gel may be obtained at an early stage. The method for using the alkaline solution may therefore preferably be employed in industrial production lines and has many advantages. An example of neutralizing the alkaline solution includes adding an acid to the alkaline solution or mixing an acid with the alkaline solution. An example of the acid includes, but not limited to, hydrochloric acid, sulfuric acid, nitric acid, boric acid, formic acid, acetic acid, citric acid, oxalic acid, fumaric acid, gallic acid, tartaric acid or the like.

In the method for producing the molded article of the present invention, the molded article containing the low molecular weight α-1,4-glucan and/or its modification and the high molecular weight α-1,4-glucan and/or its modification can be formed on the mold with any shape and made of any material. An example of the forming includes casting a solution containing the α-1,4-glucans in a mold which has desirable shape based on objective shape, or flow-casting a solution containing the α-1,4-glucans on a flat support. Another example of the forming includes cooling a solution containing the α-1,4-glucans in the air to gel without any support. In case where the molded article is an complex with the other material, the solution containing the α-1,4-glucans may be applied on the other material or may impregnate the other material to gel. An example of the other material includes plastic film, paper, cloth, nonwoven fabric, fabric, leather, wood, metal, glass, ceramic or the like.

In the method according to the present invention, a gel containing the low molecular weight α-1,4-glucan and/or its modification and the high molecular weight α-1,4-glucan and/or its modification may be employed just as gel state, or after replacing water in the gel for the other solvent. Alternatively, the gel may be dried. Any drying way may be employed in the drying. An example of the drying way includes hot-air drying, drying with dry air, vacuum drying, freeze-drying, drying with high frequency wave or microwave, or the like.

The α-1,4-glucan having high-molecular and the α-1,4-glucan having low-molecular described above are employed in the aforementioned methods. A weight ratio of the high molecular weight α-1,4-glucan and/or its modification and the low molecular weight α-1,4-glucan and/or its modification employed in the method may preferably be within the range of 99:1 to 25:75. The high molecular weight α-1,4-glucan has high water solubility and has long gelation time. The molded article obtained from the high molecular weight α-1,4-glucan however has high intensity and flexibility. On the other hand, the low molecular weight α-1,4-glucan is easy to crystal state and is difficult to mold in itself. The method according to the invention of employing the α-1,4-glucan having high-molecular and the α-1,4-glucan having low-molecular and blending the α-1,4-glucans at above rate can easily provide the molded article having high intensity and flexibility.

In one embodiment of the method for producing the molded article, a weight ratio of the high molecular weight α-1,4-glucan and/or its modification and the low molecular weight α-1,4-glucan and/or its modification employed in the method may preferably be within the range of 99:1 to 25:75. The more the amounts of the high molecular weight α-1,4-glucan, the higher intensity and flexibility the resulting molded article. The more the amounts of the low molecular weight α-1,4-glucan, the lower intensity and flexibility the resulting molded article and become breakable. On the other hand, using large amounts of the low molecular weight α-1,4-glucan can accelerate a molding speed. The weight ratio of the high molecular weight α-1,4-glucan and/or its modification and the low molecular weight α-1,4-glucan and/or its modification employed in the method is more preferably within the range of 99:1 to 50:50, most preferably within the range of 99:1 to 75:25.

In case of adding an additive to the molded article according to the present invention, adding sequence and procedure are not limited. Adding sequence and procedure may vary depending on an effect or a property of the additive. An example of the adding procedure is to mix the additives with α-1,4-glucans preliminarily, to add the additives to a solution of α-1,4-glucans, to soak the gelatinous material or the molded article of α-1,4-glucans to the additives or to apply the additives on the gelatinous material or the molded article of α-1,4-glucans. In case of adding a polymer to the molded article according to the present invention, a monomer which is corresponding to the polymer may be added to the gelatinous material or the molded article of α-1,4-glucans within it or on its surface to polymerize, then an objective polymer may be formed.

Application of the Molded Article

One embodiment of the molded article according to the present invention includes for example film or sheet. The molded article of the present invention can be shaped into film or sheet by a conventional plastic molding apparatus. Molding is not specifically limited, but includes extrusion molding, injection molding, filming molding or the like. The article of the present invention can be formed by applying the molding composition containing the specific α-1,4-glucans to a conventional molding facility and apparatus.

One another embodiment of the molded article according to the present invention includes for example fiber, yarn, non-woven fabric or another molded articles. These can be shaped by using a conventional spinning apparatus, which is an advantage of the present invention.

One another embodiment of the molded article according to the present invention can be applied to a food container for hamburgers, hot dogs, fried potatoes, ball-shape baked batter (tako-yaki), pasted rice, steamed rice, ice cream, Chinese noodle (or larmen), curried rice, vegetable, fruit, meat, fish, juice, coffee, beer, milk and the like; and an edible container, such as a corn cup for ice cream.

One another embodiment of the molded article according to the present invention includes a contact-type food container. The contact-type food container is a container which directly covers a food, for example, agricultural products such as fruit, vegetable, flower, fish and shellfish and meat, and food products such as processed food. The contact-type food container can be shaped by forming a film of one embodiment of the present invention over the agricultural products or food products.

Forming the contact-type food container makes it possible to keep a food within the container fresh. In addition, the film of one embodiment according to the present invention, made of α-1,4-glucans, has excellent gas-barrier property. Thus, covering a food such as agricultural products or food products with the film made of α-1,4-glucans can provide effective blocking of gas such as oxygen and can keep a food within the container fresh.

The film made of α-1,4-glucans is transparent, and therefore the use of the film as the contact-type food container would not cause disfigurement of contents of the container. The contents of the contact-type food container can be cooked and eaten as it stands because α-1,4-glucans are edible, and are almost tasteless and odorless. The contact-type food container can also be washed with water.

An example of the molded article of the present invention other than food container includes wide spectrum of molded articles, for example, horticultural materials such as solid fertilizer, multi-film, flowerpot, rope and net; sporting goods such as tees for golf, fishing line and stringing; daily necessaries such as air freshener, deodorant, paper diaper, sanitary products, hyperthermic pad, cooling sheet, gel for electrocataphoresis and carriers of gel filtration chromatography.

One another embodiment of the molded article according to the present invention includes gelatinous molded Japanese confectionery such as sweet bean paste (youkan), kudzu starch cake, bracken-starch dumpling and rice powder cake (uirou); gelatinous molded western confectionery such as jelly, pudding, bavarois, mousse and yogurt; gelatinous molded processed foods such as bean curd (tofu), fish paste, imitation crab, sheet foods, noodle foods and foods for the sick.

The molded article of the present invention has excellent plastic properties. Film of the molded article according to the present invention has better properties such as transparency and glossiness than general plastic film has. Using the film according to the present invention as a packaging material has an advantage that color or pattern of contents of the packing can be seen clearly. In addition, the molded article containing α-1,4-glucans according to the present invention has no trouble with dust attachment in use, in storage or under printing because the molded article has little electrostatic property. Furthermore, the film according to the present invention can be heat-sealed and adhere in wet condition. The molded particle according to the present invention also has excellent air barrier property such as oxygen. Thus, using the film according to the present invention as packaging material or coating can effectively protect air-labile materials.

The molded article according to the present invention is composed of α-1,4-glucans, therefore, the molded article is buried in the earth and is decomposed by bacteria or microorganism. The article does not give rise to environmental pollution problem of waste and therefore is different from conventional article formed from synthetic plastics. Time for decomposition is not specifically limited and depends on composition of article or condition of surrounding, but usually is in time period of several weeks to several months. The article can be also used for feedstuff or compost other than embedding in the earth, although it depends on the final shaped products.

α-1,4-glucans and/or its modification in the molded article according to the present invention has excellent biodegradability in the natural environment. In addition, intermediate in the degradation of biodegradable step is safe and has excellent safety for human and the natural environment. The present invention can provide the molded article with excellent properties containing only α-1,4-glucans and/or its modification as molding component. In the present invention, there is no necessity to use other polymeric materials. Therefore, the present invention can provide the molded article with excellent biodegradability and safety.

The molded article according to the present invention need not to heat in molding necessarily, and can be molded without heating. According to the present invention, the molded article including thermal-labile and acceptable non thermal history contents such as an enzyme, chemicals and a flavor compound can be easily prepared without complex procedure.

The molded article can be capsules formed from the α-1,4-glucans and/or its modification.

According to the present invention, the capsules can be applied to wide variety of fields by changing its content and their shape and form are not limited.

The capsules can be obtained by art-known methods, such as (i) a rotally method for a soft capsule wherein content is covered with two pieces of sheet and shaped in a mold, (ii) a chemical method for a soft capsule, such as curing and covering in air or liquid, and (iii) a method for a hard capsule, wherein a male capsule element and a female capsule element are combined with each other.

The capsules are applied to industrial products, pharmaceuticals or agricultural chemicals, medical products, feedstuff, fertilizer, commodities or cosmetics.

According to the present invention, the capsule shell is formed from the chemically modified α-1,4-glucans of the present invention and therefore can be modified in required characteristics against the content of the capsule (such as hydrophobic nature or lipophilic nature and hydrophilic nature) or required characteristic to applicable usage (such as, processability, mechanical characteristics, film forming ability and affinity with human body), by changing degree of modification (DS) or formulating additives or fillers. In case where the capsules are obtained from α-1,4-glucans that is chemically modified and has low molecular weight, the resulting capsules have superior stability to retrogradation.

The content of the capsules is not limited and can be solid powder, hydrophilic or hydrophobic liquid or solution. If the content is hydrophobic, the capsules are formed from non-substituted or low acetylated hydrophilic α-1,4-glucans. If the content is hydrophilic, the capsules are formed from high acetylated hydrophobic α-1,4-glucans. In case where the capsules are orally administered, the capsules are made digestible or decomposable in the digestive organ, and in case where the capsules are applied to pharmaceutical medicines or medical products, the capsules are made decomposable or absorbable in the body.

The α-1,4-glucans of the present invention is, made of low molecular weight carbohydrate material, such as glucose-1-phosphate and therefore is harmless to human body because of no invasion of virus, bacteria or prion. The molded article of the present invention can be applied to biocompatible medical material or medical appliance using the biocompatible medical material. By the term "medical material" is meant one that is directly applied to human body on the purpose of medical treatment. The medical appliance is one that is applied to diseased portions, such as skin, muscular tissue or internal organ tissue on the purpose of medical treatment, similar to the medical material, formed from a combination of the medical material and another substrate, solvent, part or device. The medical appliance, for example, includes adhesion inhibitor that interposes between diseased tissues and inhibits adhesion of tissue; tissue adhesive that applies on a diseased portion, such as seamed portion to adhere the tissues; wound dressing to cover the diseased portion, such as injured portion to protect; hemostatic or tampon that is applied to diseased portion, such as injured portion or dissected portion to stop brood flowing; or the like.

In the present invention, the affinity between the medical materials and human body can be controlled by changing a ratio of substitutent groups in modifying the α-1,4-glucans, i.e. hydrophilic group and hydrophobic group or by changing DS as chemical modification, as mentioned above. The article also has decomposition and/or absorption in vivo after finishing healing.

An amount of the medical material or medical appliance is changeable based on area of diseased portion, time and period for forming gel and the like. In this context, the term "gel formation" means gelation of the medical material absorbing or keeping body fluid or brood oozing out from diseased portion. The gelation of the medical material keeps the diseased portion wet condition and promotes formation of scar skin and prevents invasion of bacteria and the like.

According to the present invention, the medical material or medical appliance can be formed by mixing the above mentioned components (the α-1,4-glucans and/or its modification (a), other polymer material (b) and optional additives, such as plasticizer) and forming into desired shape. Sterilizing can be conducted either after mixing, or after forming or the both. The medical material or medical appliance can be put into a pouring bottle (injector type container) together with propellant and sprayed out from the bottle onto diseased portion. It may also be formed into a compressing material or a sealing agent composed of a coating layer and a releasable protective sheet and then applied to a diseased portion.

The medical material or medical appliance is inherently harmless to the human body and has biocompatibility or mechanical characteristics. It can be formed into thread or fabric, non-woven fabric, film, sheet, tube, capsule or other molded article, paste, cream or a combination thereof.

The medical material or medical appliance can be applied to variety of mammals, such as domestic animals and pets, other than human beings. It is useful for health support, internal treatment and surgical treatment.

EXAMPLE

The present invention is further explained in detail hereinafter referring to synthesis examples, examples and comparative examples, and is not limited thereto. Unless otherwise specified, "part" in each of the examples means "part by weight", and "%" means "% by weight".

In the production examples, a preparation method of purified glucan phosphorylase which is derived from potato, a preparation method of sucrose phosphorylase which is derived from *Streptococcus mutans*, a method for calculating a yield (%) of α-1,4-glucan and methods for measuring weight-average molecular weight (Mw) and number average molecular weight (Mn) were followed known methods described in JP Kokai 2002-345458. For details, molecular weight of synthesized glucan was measured in the following way. First, synthesized glucan was completely dissolved in 1N solution of sodium hydrate, and the resulting solution was neutralized using appropriate amount of a solution of hydrochloric acid. The resulting solution containing glucan (about 300 μg) was subject to a gel filtration chromatography equipped with a differential refractometer detector and a multangular light scattering detector to measure a measuring weight-average molecular weight (Mw) of glucan. Shodex SB806M-HQ (manufactured by SHOWA DENKO K.K.) was used as the column of the chromatography. A multangular light scattering detector (DAWN-DSP, manufactured by Wyatt Technology Inc.) and a differential refractometer detector (Shodex RI-71, manufactured by SHOWA DENKO K.K.) were used as a detector, and the detectors were joined in order. A temperature of the column was kept about 40° C. A solution of sodium nitrate (0.1 N) was used as an eluting solvent, its flow rate was 1 mL/min. Resulting signal was collected with the use of a data analysis software (product name "ASTRA", manufactured by Wyatt Technology Inc.) and analysed using the software to measure a weight-average molecular weight (Mw) and number average molecular weight (Mn).

A tensile strength of a film was determined by the following way. A test sample (width: 12.7 mm, length: 152.4 mm) was left in a temperature- and humidity-controlled room of temperature: 26° C., relative humidity: 55% for 1 day, then tensile test was performed in the same room. The test sample of which thickness was measured was set in a tensile testing machine (Autograph AGS-H, manufactured by SHIMADZU CORPORATION) in such a way that a distance between clutches of the machine in the sample was 100 mm, and the test sample was pulled to its breaking point at velocity of 10 mm/min. Test results of five samples were averaged, excepting a test result of breaking the sample in a clutches. A tensile strength was calculated by dividing load of the sample at break point by cross-section area of the sample. A tensile strength of monofilament was determined by the same way except that a distance between clutches of the machine in the sample was 20 mm and test results of ten samples were averaged.

A compression test of a hard capsule was determined by the following way. A hard capsule which is encapsulated official lactose (200M, manufactured by GOKYO SANGYO Inc.) was set on a specimen support of Rheometer (FUDOH RT-200 2D D) transversely, after that the capsule was sandwiched between a discoid adapter of 20 mm in diameter. The specimen support was moved 3 mm upwards at velocity of 60 mm/min to compress, then the specimen support was moved downward. This procedure was repeated five times, after that a condition of the capsule such as breaking or dent was observed. Five samples of the capsule were tested.

Production Examples 1-5

Synthesis of α-1,4-glucans

To a reaction solution (1 liter) containing 6 mM of phosphate buffer solution (pH 7), 106 mM of sucrose and maltooligosaccharide mixture with various concentration (880, 149, 132, 8.8 or 4.1 mg/liter), purified glucan phosphorylase derived from potato tuber (1 unit/ml) and sucrose phosphorylase derived from *Streptococcus mutans* (1 unit/ml) were added and kept at 37° C. for 16 hours. After the reaction was completed, a yield (%), a weight-average molecular weight (Mw) and a molecular weight distribution (Mw/Mn) of resulting α-1,4-glucans were determined. The results were shown in Table 1.

Table 1 shows that α-1,4-glucans having Mw of 11.0 to 780.5 kDa were obtained by changing concentration ratio of sucrose and primer (i.e., maltooligosaccharide) in the reaction. The molecular weight distributions (Mw/Mn) of the obtaining α-1,4-glucans were sharp (All Mw/Mn were not greater than 1.05.).

TABLE 1

| Sample | maltooligo-saccharide mixture mg/liter)) | Yield (%) | Mw(kDa) | degree of polymerization | Mw/Mn |
|---|---|---|---|---|---|
| Production example 1 | 880 | 90.2 | 30.2 | 186 | 1.03 |
| Production example 2 | 149 | 88.1 | 100.2 | 619 | 1.02 |
| Production example 3 | 132 | 87.9 | 108.2 | 668 | 1.02 |
| Production example 4 | 8.8 | 84.0 | 780.5 | 4818 | 1.01 |
| Production example 5 | 4.1 | 81.7 | 1490 | 9198 | 1.01 |

Production of Film

Neutralization Procedure

Examples 1 and 2

Powders produced from Production example 1 and Production example 4 were mixed at weight ratio of 50:50, and 15 g of the resulting mixture was picked up and was dissolved in 85 g of 1N sodium hydroxide solution to prepare a stock solution. The stock solution was spread over the glass plate in a thickness of about 0.6 mm, and the plate was soaked into a vat filled with 1N hydrochloric acid solution for about 1 minute to gel. The resulting film-like gel was washed with flowing water, and dried in a desiccator with a rack at 50° C. to obtain a transparent film having a thickness of 50 μm (Example 1). A similar procedure was performed by using powders produced from Production example 1 and Production example 3 (at weight ratio of 50:50) to obtain a film (Example 2).

Comparative Examples 1 to 8

α-1,4-glucans produced from Examples 1 to 4 and commercial cornstarch were mixed in the combination and weight ratio shown in Table 2 to make a film in a similar way of Example 1.

The information of film obtained the above examples and comparative example was shown in Table 2.

TABLE 2

| | Sample | ratio | formability |
|---|---|---|---|
| Example 1 | Production example 1:Production example 4 | 50:50 | Transparent film was obtained. |
| Example 2 | Production example 1:Production example 3 | 50:50 | Transparent film was obtained. |
| Comparative example 1 | Production example 1:Production example 2 | 50:50 | Opalescent film was obtained. |
| Comparative example 2 | Production example 1:cornstarch | 50:50 | Brittle gel was obtained and did not form film. |
| Comparative example 3 | Production example 4:cornstarch | 50:50 | Film was not obtained because of no coagulation. |
| Comparative example 4 | Production example 1 | — | Brittle gel was obtained and did not form film. |
| Comparative example 5 | Production example 2 only | — | Transparent film was obtained. |
| Comparative example 6 | Production example 3 only | — | Transparent film was obtained. |
| Comparative example 7 | Production example 4 | — | Film was not obtained because of no coagulation. |
| Comparative example 8 | cornstarch | — | Brittle gel was obtained and did not form film. |

Measurement of Tensile Strength of the Film

Strength of the film obtained above Examples and Comparative examples were measured. The results were shown in Table 3. The results of Examples were far superior to the results of Comparative examples in tensile strength and elongation.

TABLE 3

| | Sample | Tensile strength (MPa) | elongation (%) |
|---|---|---|---|
| Example 1 | Production example 1:Production example 4 (50:50) | 69 | 41 |
| Example 2 | Production example 1:Production example 3 (50:50) | 65 | 15 |
| Comparative example 1 | Production example 1:Production example 2 (50:50) | 41 | 9 |

TABLE 3-continued

| Sample | | Tensile strength (MPa) | elongation (%) |
|---|---|---|---|
| Comparative example 2 | Production example 1:cornstarch (50:50) | 25 | 9 |
| Comparative example 5 | Production example 2 only | 31 | 5 |
| Comparative example 6 | Production example 3 only | 38 | 7 |

Production of Film

Adding Low Molecular Weight α-1,4-Glucan

Example 3

α-1,4-glucan produced from Production example 5 (48.5 g, degree of polymerization: 9198) was dissolved in 1 liter of distilled water with a temperature of about 25° C. To the solution, 7.5 g of a solution containing 20 wt. % of α-1,4-glucan produced from Production example 1 (degree of polymerization: 186) in dimethylsulfoxide which was preliminary prepared was added. The resulting solution containing α-1,4-glucans (a weight ratio of high molecular weight α-1,4-glucan to low molecular weight α-1,4-glucan is 97:3) was poured into a vat with a thickness of about 5 mm and was left statically, then geleted in about 40 minutes. The resulting gel was dried in a desiccator with a rack to obtain a transparent film having a thickness of about 200 μm.

Comparative Example 7

A similar procedure of Example 3 was performed by using same amount of α-1,4-glucan produced from Production example 4 instead of α-1,4-glucan produced from Production example 1 in order to make film. On the other hand, α-1,4-glucan produced from Production example 5 was solely used in order to make film without mixing low molecular weight α-1,4-glucan. In both cases coagulation was not generated and therefore film was not obtained.

Example 4

α-1,4-glucans produced from Production examples 1 and 4 were mixed at weight ratio of 20:80, and 200 g of the resulting mixture was dispersed in 1800 ml of distilled water and heated at 130° C. for 30 minutes with a pressure-resistant container to dissolve. The resulting solution was immediately poured into a vat in a thickness of about 5 mm and was left statically under room temperature, after that the solution geld in a few minutes. The resulting gel was dried in a desiccator with a rack to obtain a transparent film having a thickness of about 200 μm.

Comparative Examples 8 of 11

In each case, a similar procedure of Example 4 was performed by solely using α-1,4-glucan produced from Production example 1, 2, 4 or 5 instead of α-1,4-glucans produced from Production examples 1 and 4. In case of using α-1,4-glucan produced from Production example 1, precipitation was generated when the resulting solution was cooled, and gelation was not generated. In case of using α-1,4-glucan produced from Production example 2, coagulation was generated in a few minutes and film was obtained after drying. In case of using α-1,4-glucan produced from Production example 4, gelation required for several hours. In case of using α-1,4-glucan produced from Production example 5, the resulting solution was still clear and gelation was not generated even after several days.

Measurement of Tensile Strength of the Film

Strength of the film obtained above Example 4 and Comparative examples 8 to 11 were measured. The results were shown in Table 4. The result of Example 4 was far superior to the results of Comparative examples 8 to 11 in tensile strength and elongation.

TABLE 4

| | Sample | Tensile strength (MPa) | elongation (%) |
|---|---|---|---|
| Example 4 | Production example 1:Production example 4 (20:80) | 65 | 50 |
| Comparative example 8 | Production example 1 only | did not form film | |
| Comparative example 9 | Production example 2 only | 36 | 4 |
| Comparative example 10 | Production example 4 only | 61 | 47 |
| Comparative example 11 | Production example 5 only | did not form film | |

Production of Monofilament

Examples 5 to 8

Figure 1:
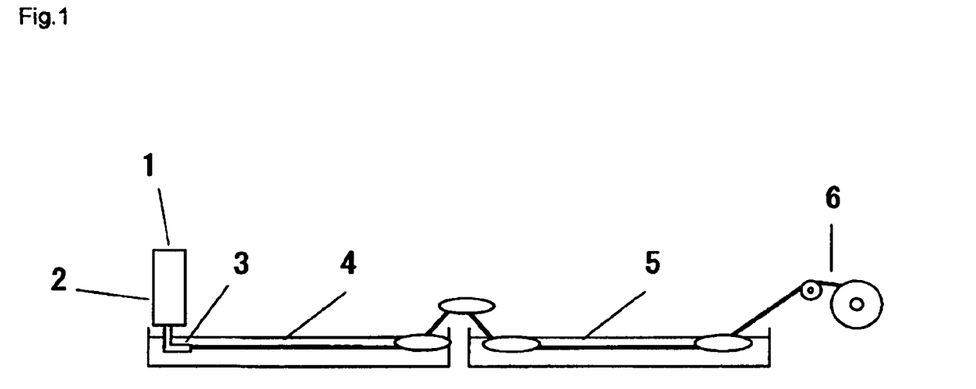
FIG. 1 is a diagrammatic illustration of a wet spinning machine usable for the present invention.

A monofilament was produced using wet spinning machine shown in FIG. 1. A stock solution (1) of α-1,4-glucans in 1N sodium hydroxide solution was extruded at a cap (3) with gear pump (2) into a tank filled with 1N hydrochloric acid solution to gel. The resulting product was washed in a washing tank (5), and rolled up with a winding device (6) and was dried. A mixture of α-1,4-glucans produced in Production example 1 and Production example 3 at weight ratio of 50:50, a mixture of α-1,4-glucans produced in Production example 1 and Production example 4 at weight ratio of 50:50 or a mixture of α-1,4-glucans produced in Production example 1 and Production example 4 at weight ratio of 75:25 was used as the stock solution to obtain a monofilament with a diameter of 30 to 80 μm.

Comparative Examples 12 to 15

In each case, a similar procedure of Examples 5 and 6 was performed by solely using α-1,4-glucan produced from Production example 1, 2, 3 or 4 instead of using α-1,4-glucans produced from Production examples. In case of using single α-1,4-glucan produced from Production example 1 or 2, a resulting product broke at winding because of fragility of the product before drying; and a monofilament greater than 1 meter long was not obtained. In case of using α-1,4-glucan produced from Production example 4, coagulation was not generated in a hydrochloric acid solution, but diffusion was generated, thus a monofilament was not obtained.

Measurement of Strength of Monofilament

Strength of the monofilament obtained above Examples and Comparative examples were measured. The results were shown in Table 5. The results of Examples were far superior in strength and elongation to the results of Comparative examples which were obtained using single α-1,4-glucan, and the monofilaments of Examples were tough and flexible.

Changing a weight ratio of α-1,4-glucans produced in Production examples 1 and 4 made it possible to control strength and elongation of monofilament.

TABLE 5

| Sample | | Tensile strength (MPa) | elongation (%) |
|---|---|---|---|
| Example 5 | Production example 1 + Production example 4 (25:75) | 175 | 48.0 |
| Example 6 | Production example 1 + Production example 4 (50:50) | 133 | 25.6 |
| Example 7 | Production example 1 + Production example 4 (75:25) | 121 | 11.2 |
| Example 8 | Production example 1 + Production example 3 (50:50) | 85 | 7.9 |
| Comparative example 12 | Production example 1 + Production example 2 (50:50) | 79 | 6.1 |
| Comparative example 13 | Production example 1 only | 28 | 2.1 |
| Comparative example 14 | Production example 2 only | 34 | 3.5 |
| Comparative example 15 | Production example 3 only | 37 | 4.6 |

Production of Hard Capsule

Examples 9 and 10

Powders produced from Production example 1 and Production example 4 were mixed at weight ratio of 50:50, and 20 g of the resulting mixture was picked up and was dissolved in 80 g of 1N sodium hydroxide solution to prepare a stock solution. A stainless-steel cylindrical pin having a diameter of 7.0 mm or 6.7 mm with a hemispherical tip was dipped in the stock solution and then pulled up. The pin was dipped in 1N hydrochloric acid solution to coagulate, and the resultant was washed with water and dried at 40° C., then two of the resultants with different diameter were combined to obtain a hard capsule. Another hard capsule was obtained by using a mixture of powders produced from Production example 1 and Production example 3 (weight ratio of 50:50) in a similar way.

Comparative Examples 16 to 18

In each case, a similar procedure of Examples 9 and 10 was performed except solely using α-1,4-glucan produced from Production example 1, 3 or 4. In addition, α-1,4-glucan produced from Example 1 and cornstarch were mixed at weight ratio of 50:50 to make a hard capsule in a similar way. In case of solely using α-1,4-glucan produced from Production example 1, a resulting product broke depending on its contraction at drying. In case of solely using α-1,4-glucan produced from Production example 4, coagulation did not generate when the pin was dipped in hydrochloric acid solution, and did not obtain a capsule.

Compression Test of the Hard Capsule

Compression tests of the hard capsule obtained above Examples and Comparative examples were performed. The results were shown in Table 6. Shown in Table 6, each hard capsule obtained in Comparative example 16 or 17 solely using α-1,4-glucan was cracked by compression. A hard capsule obtained in Comparative example 18 using cornstarch instead of α-1,4-glucan was not cracked but crushed by compression, and was not restored.

TABLE 6

| | Sample | Sample condition after compression test |
|---|---|---|
| Example 9 | Production example 1 + Production example 4 (50:50) | no cracked |
| Example 10 | Production example 1 + Production example 3 (50:50) | no cracked |
| Comparative example 16 | Production example 1 only | cracked |
| Comparative example 17 | Production example 3 only | cracked |
| Comparative example 18 | Production example 1 + corn starch (50:50) | crushed and not restored |

Production of Gelatinous Food Product

Examples 11 to 13 and Comparative Examples 19 and 20

α-1,4-glucan produced from Production example 5 (40 g, degree of polymerization: 9198) was dissolved in 1000 ml of water with heating to obtain a solution of high molecular weight α-1,4-glucan. α-1,4-glucan produced from Production example 1 (40 g, degree of polymerization: 186) was dispersed in 1000 ml of water and was heated to 130° C. to obtain a solution of low molecular weight α-1,4-glucan. Orange juice keeping a temperature of 10° C., the solution of high molecular weight α-1,4-glucan keeping a temperature of 80° C. and the solution of low molecular weight α-1,4-glucan keeping a temperature of 80° C. were mixed quickly at weight ratio shown in Table 7, and the mixture was cooled in a refrigerator for 4 hours to obtain a orange jelly. The results were shown in Table 7. In Examples 11 to 13 containing high molecular weight α-1,4-glucan and low molecular weight α-1,4-glucan, good orange jelly was obtained. However, in Comparative example 19 containing solely high molecular weight α-1,4-glucan, and in Comparative example 20 containing solely low molecular weight α-1,4-glucan, orange jelly could not be obtained because gelation was not generated.

| Sample | Orange juice (ml) | solution of high molecular weight α-1,4-glucan (ml) | solution of low molecular weight α-1,4-glucan (ml) | formation of gel |
|---|---|---|---|---|
| Comparative example 19 | 200 | 200 | 0 | no gelation and still liquid state |
| Example 11 | 200 | 196 | 4 | gelation |
| Example 12 | 200 | 100 | 100 | gelation |
| Example 13 | 200 | 50 | 150 | gelation |
| Comparative example 20 | 200 | 0 | 200 | no gelation and still liquid state sediment formation |

The above Examples show that the molded article according to the present invention, which contains α-1,4-glucans, has excellent formability because it can be shaped in a short time, furthermore, the molded article has excellent property for molded article. The molded article has the advantage of excellent safety for human being and the natural environment.

INDUSTRIAL APPLICABILITY

The present invention makes it possible to produce a molded article containing α-1,4-glucans and/or its modifica-

What is claimed is:

1. A process for preparing a molded article consisting essentially of:
   (i) high molecular weight linear α-1,4-glucan and
   (ii) low molecular weight linear α-1,4-glucan,
   wherein the process comprises the step of:
   adding the low molecular weight linear α-1,4-glucan to a solution comprising the high molecular weight linear α-1,4-glucan to gel the solution, wherein
   the low molecular weight linear α-1,4-glucan has a degree of polymerization of greater than or equal to 180 and less than 620, and has a molecular weight distribution of not greater than 1.25 and,
   the high molecular weight linear α-1,4-glucan has a degree of polymerization of greater than or equal to 620 and less than 37000, and has a molecular weight distribution of not greater than 1.25.

2. The process for preparing a molded article according to claim 1, wherein
   the low molecular weight linear α-1,4-glucan has a degree of polymerization of greater than or equal to 180 and less than 560, and has a molecular weight distribution of not greater than 1.25 and,
   the high molecular weight linear α-1,4-glucan has a degree of polymerization of greater than or equal to 680 and less than 37000, and has a molecular weight distribution of not greater than 1.25.

3. The process for preparing a molded article according to claim 1, wherein the α-1,4-glucans are enzyme-synthesized α-1,4-glucan.

4. The process for preparing a molded article according to claim 1, wherein the weight ratio of the high molecular weight linear α-1,4-glucan and the low molecular weight linear α-1,4-glucan is within the range of 99:1 to 25:75.

5. The process for preparing a molded article according to claim 1, wherein the weight ratio of high molecular weight linear α-1,4-glucan:low molecular weight linear α-1,4-glucan is within the range of 99:1 to 50:50.

6. The process for preparing a molded article according to claim 1, wherein the weight ratio of high molecular weight linear α-1,4-glucan:low molecular weight linear α-1,4-glucan is within the range of 99:1 to 75:25.

7. The process for preparing a molded article according to claim 1,
   wherein the process further comprises the step of:
   cooling a solution comprising the high molecular weight linear α-1,4-glucan and the low molecular weight linear α-1,4-glucan to gel the solution, wherein
   the low molecular weight linear α-1,4-glucan has a degree of polymerization of greater than or equal to 180 and less than 620, and has a molecular weight distribution of not greater than 1.25 and,
   the high molecular weight linear α-1,4-glucan has a degree of polymerization of greater than or equal to 620 and less than 37000, and has a molecular weight distribution of not greater than 1.25.

8. The process for preparing a molded article according to claim 7, wherein
   the low molecular weight linear α-1,4-glucan has a degree of polymerization of greater than or equal to 180 and less than 560, and has a molecular weight distribution of not greater than 1.25 and,
   the high molecular weight linear α-1,4-glucan has a degree of polymerization of greater than or equal to 680 and less than 37000, and has a molecular weight distribution of not greater than 1.25.

9. The process for preparing a molded article according to claim 7, wherein the weight ratio of the high molecular weight linear α-1,4-glucan and the low molecular weight linear α-1,4-glucan is within the range of 99:1 to 25:75.

10. The process for preparing a molded article according to claim 7, wherein the weight ratio of high molecular weight linear α-1,4-glucan:low molecular weight linear α-1,4-glucan is within the range of 99:1 to 50:50.

11. The process for preparing a molded article according to claim 7, wherein the weight ratio of high molecular weight linear α-1,4-glucan:low molecular weight linear α-1,4-glucan is within the range of 99:1 to 75:25.

12. The process for preparing a molded article according to claim 1,
    wherein the process further comprises the step of:
    neutralizing an alkaline solution comprising the high molecular weight linear α-1,4-glucan and the low molecular weight linear α-1,4-glucan to gel the solution, wherein
    the low molecular weight linear α-1,4-glucan has a degree of polymerization of greater than or equal to 180 and less than 620, and has a molecular weight distribution of not greater than 1.25 and,
    the high molecular weight linear α-1,4-glucan has a degree of polymerization of greater than or equal to 620 and less than 37000, and has a molecular weight distribution of not greater than 1.25.

13. The process for preparing a molded article according to claim 12, wherein
    the low molecular weight linear α-1,4-glucan has a degree of polymerization of greater than or equal to 180 and less than 560, and has a molecular weight distribution of not greater than 1.25 and,
    the high molecular weight linear α-1,4-glucan has a degree of polymerization of greater than or equal to 680 and less than 37000, and has a molecular weight distribution of not greater than 1.25.

14. The process for preparing a molded article according to claim 12, wherein the weight ratio of the high molecular weight linear α-1,4-glucan and the low molecular weight linear α-1,4-glucan is within the range of 99:1 to 25:75.

15. The process for preparing a molded article according to claim 12, wherein the weight ratio of high molecular weight linear α-1,4-glucan:low molecular weight linear α-1,4-glucan is within the range of 99:1 to 50:50.

16. The process for preparing a molded article according to claim 12, wherein the weight ratio of high molecular weight linear α-1,4-glucan:low molecular weight linear α-1,4-glucan is within the range of 99:1 to 75:25.

* * * * *